United States Patent

Vasselin et al.

[11] Patent Number: 5,616,418
[45] Date of Patent: Apr. 1, 1997

[54] THERMOPLASTIC ELASTOMER POLYBLENDS COMPRISING POLYAMIDES/MODIFIED POLYOLEFINS AND SHAPED ARTICLES PRODUCED THEREFROM

[75] Inventors: Thierry Vasselin, Evreux; Michel Vuachet, Bron, both of France

[73] Assignee: Atochem, Puteaux, France

[21] Appl. No.: 373,884

[22] Filed: Dec. 28, 1994

Related U.S. Application Data

[62] Division of Ser. No. 139,090, Oct. 21, 1993, abandoned, which is a continuation of Ser. No. 998,651, Dec. 30, 1992, abandoned, which is a continuation of Ser. No. 709,210, Jun. 3, 1991, abandoned.

[30] Foreign Application Priority Data

Jun. 1, 1990 [FR] France .................................. 90 06869

[51] Int. Cl.$^6$ .......................... B32B 27/08; B32B 27/32; B32B 27/34
[52] U.S. Cl. .................... 428/474.7; 428/474.4; 428/474.9; 428/475.5; 428/475.8; 428/476.1; 428/476.3; 428/476.9; 428/423.5; 428/423.3; 428/424.2; 428/424.4; 525/66; 525/92 A; 525/92 B; 525/167
[58] Field of Search .............................. 428/474.4, 474.7, 428/474.9, 475.5, 475.8, 476.1, 476.3, 476.9, 423.5, 423.3, 424.2, 424.4

[56] References Cited

U.S. PATENT DOCUMENTS

| 4,397,991 | 8/1983 | Drawert et al. | 525/167 |
| 4,717,618 | 1/1988 | Tse et al. | 428/213 |
| 4,855,181 | 8/1989 | Shimo et al. | 428/336 |
| 4,911,979 | 3/1990 | Nishimoto et al. | 428/332 |
| 5,140,065 | 8/1992 | Dalla Torre et al. | 525/66 |
| 5,348,804 | 9/1994 | Vasselin et al. | 428/423.1 |

FOREIGN PATENT DOCUMENTS

| 2523143 | 9/1983 | France | 525/167 |
| 0015554 | 1/1983 | Japan | 525/167 |
| 0071348 | 4/1984 | Japan | 525/167 |
| 60-23435 | 2/1985 | Japan . | |

*Primary Examiner*—Ana Woodward
*Attorney, Agent, or Firm*—Burns, Doane, Swecker & Mathis, L.L.P.

[57] ABSTRACT

Polyblend compositions well adopted for the production of a wide variety of useful shaped articles having improved physical/chemical properties, e.g., fibers, films, sheets, composites, and the like, comprise (a) at least one polyamide thermoplastic elastomer, e.g., a polyetheresteramide, and (b) at least one modified polyolefin, e.g, an optionally maleized copolymerizate of ethylene and vinyl acetate, a copolymerizate of ethylene and (meth)acrylic acid, a copolymerizate of ethylene, vinyl acetate and (meth)acrylic acid and/or an alkyl (meth)acrylate, a copolymerizate of ethylene, an alkyl (meth)acrylate and, optionally, maleic anhydride, or maleized SBS, SIS or SEBS.

5 Claims, No Drawings

THERMOPLASTIC ELASTOMER POLYBLENDS COMPRISING POLYAMIDES/MODIFIED POLYOLEFINS AND SHAPED ARTICLES PRODUCED THEREFROM

CROSS-REFERENCE TO PARENT APPLICATIONS

This application is a divisional, of application Ser. No. 08/139,090, filed Oct. 21, 1993 (now abandoned) which is a continuation of application Ser. No. 07/998,651, filed Dec. 30, 1992 (now abandoned), which is a continuation of application Ser. No. 07/709,210, filed Jun. 3, 1991 (now abandoned).

BACKGROUND OF THE INVENTION

1. Field of the Invention

The present invention relates to novel thermoplastic elastomer compositions (TPE) based on polyamides and modified polyolefins, and to the production of a wide variety of useful shaped articles therefrom.

2. Description of the Prior Art

FR-2,523,143 describes polymer compositions containing copolymers based on ethylene (at least 35% by weight) and on at least one vinyl ester, and containing 0.5% to 20% by weight of a copolyetheresteramide. These compositions are used as hot melt adhesives.

J-62/84,141 describes resin compositions prepared by admixing, in the molten state, 100 parts by weight of polyetheresteramide and 3 to 50 parts by weight of a copolymer of ethylene and vinyl acetate, grafted with vinyl chloride.

SUMMARY OF THE INVENTION

A major object of the present invention is the provision of improved polyblend compositions comprising at least one thermoplastic elastomer based on a polyamide and at least one modified polyolefin, the amount by weight of said thermoplastic elastomer or elastomers constituting at least 50% and preferably at least 60% of the total weight of the thermoplastic elastomer or elastomers and of the modified polyolefin or polyolefins.

DETAILED DESCRIPTION OF PREFERRED EMBODIMENTS OF THE INVENTION

More particularly according to the present invention, the thermoplastic elastomer or elastomers, or TPE, based on a polyamide are either statistical or sequenced copolymers.

Statistical copolymers are formed by the random bonding of chains of various components (monomers and/or prepolymers), while the preferred sequenced or block copolymers comprise blocks having certain chain lengths of their different constituents.

The copolymers based on a polyamide according to the invention are either polyesteramides or polyetheramides.

The sequenced polyetheramides or block polyetheramides are conveniently prepared by polycondensation of polyamide recurring structural units or sequences having reactive terminals or endgroups, with polyether sequences, also having reactive terminals, such as, inter alia:

(a) Polyamide sequences having dicarboxylic acid endgroups, with polyoxyalkylene sequences having dicarboxylic endgroups, (b) Polyamide sequences having dicarboxylic endgroups, with polyoxyalkylene sequences having diamine endgroups, prepared via the cyanoethylation and hydrogenation of alpha, omega-dihydroxylated aliphatic polyoxyalkylene recurring structural units, designated polyether diols.

(c) Polyamide sequences having dicarboxylic endgroups, with polyetherdiols, designated polyetheresteramides, which are especially preferred.

The composition and preparation of such polyetheresteramides are described in FR-2,273,021 and FR-2,401,947, assigned to the assignee hereof and hereby expressly incorporated by reference.

The number average molecular weight of such polyamide sequences typically ranges from 500 to 10,000 and preferably from 600 to 5,000. The polyamide sequences of such polyetheresteramides preferably comprise aliphatic polyamides and/or amorphous polyamides, or the copolyamide prepared via the polycondensation of the respective monomers.

The number average molecular weight of the polyethers advantageously ranges from 200 to 6,000 and preferably from 600 to 3,000.

The polyether sequences preferably comprise polytetramethylene glycol (PTMG), polyethylene glycol (PEG) and/or polypropylene glycol (PPG).

The inherent viscosity of the subject polyetheresteramides advantageously ranges from 0.8 to 2.05. It is measured in meta-cresol at 20° with an initial concentration of 0.5 g polymer per 100 g meta-cresol.

The aforesaid polyetheresteramides advantageously comprise 5% to 85% by weight of polyether and 95% of 15% by weight of polyamide, preferably 30% to 85% by weight polyether and 70% to 15% by weight polyamide.

The preferred polyetheresteramides are those in which the polyamide sequences essentially consist of PA-11, PA-12 and/or PA-12/12 (nylons 11, 12 and/or 12/12). If a composition having antistatic properties is desired, preferably polyetheresteramides are used, the polyether sequences of which essentially consist of polyethylene glycol (PEG).

By the term "modified polyolefins" are intended polymers prepared from the following:

(i) an ethylene or α-olefin monomer, or, optionally, a diolefin, and (ii) at least one comonomer selected from among the vinyl esters of saturated carboxylic acids, unsaturated mono- and dicarboxylic acids, the esters and salts thereof, and anhydrides of saturated or unsaturated dicarboxylic acids.

The olefin constitutes at least 50%, preferably at least 60%, of the total weight of the copolymer.

These copolymers may be statistical or sequential polymers and may be linear or branched.

Particularly exemplary thereof are the following:

(1) Copolymers of ethylene and vinyl acetate (EVA), whether or not, maleized, which are particularly preferred (the maleic anhydride may either be grafted onto an EVA backbone, or terpolymerized with the ethylene and VA), containing 2% to 40% by weight vinyl acetate, 0% to 0.5% by weight graft maleic anhydride or 0% to 10% by weight terpolymerized maleic anhydride relative to the total weight of the copolymer;

(2) Copolymers of ethylene and (meth)acrylic acid containing 2% to 40% acid relative to the total weight of the copolymer;

(3) Ethylene, vinyl acetate, and, optionally, (meth)acrylic acid and/or alkyl (meth)acrylate (such as glycidyl methacrylate) containing 2% to 40% by weight vinyl acetate and 0% to 9% by weight (meth)acrylic acid and/or alkyl (meth)acrylate;

(4) Copolymers of ethylene, alkyl (meth)acrylate (such as methyl, ethyl, N-butyl acrylate) and, optionally, maleic anhydride, containing 2% to 40% by weight alkyl (meth)acrylate and 0% to 8% by weight anhydride relative to the total weight of the copolymer.

The term "modified polyolefins" also comprehends block copolymers based on styrene, and in particular, those composed of sequences of polystyrene and sequences of polybutadiene (SBS), sequences of polystyrene and sequences of polyisoprene (SIS), sequences of polystyrene and poly(ethylene/butylene) (SEBS) containing 0.2% to 0.8% by weight maleic anhydride and 30% to 55% styrene for SBS, 15% to 25% for SIS and 13% to 32% for SEBS.

Various other components may be incorporated into the compositions described above, such as fillers, pigments or colorants, different additives and adjuvants, etc.

Exemplary such fillers include glass or carbon fibers, aramid resins, talc, silica, kaolin, glass beads and pellets, ceramics, metallic fillers, metallic salts and oxides, such as aluminum powder, calcium and manganese carbonates, ferrite powders, titanium dioxide, and the like.

In general, up to 50% and preferably up to 40% by weight of fillers may be incorporated relative to the total weight of the thermoplastic elastomer and modified polyolefin compositions.

Exemplary additives and adjuvants include anti-UV agents, mold release agents, impact strength-enhancing agents, etc.

The compositions according to the invention are conveniently prepared by compounding namely, the components, typically in the form of granules having a diameter less than 5 mm, are mixed in the molten state, generally in a mixer, at a temperature ranging from 190° to 250° C.

In light of their ready preparation, their good mechanical properties (in particular their low temperature impact strength, abrasion resistance, tear strength, etc.), their dimensional stability at temperatures ranging from −20° to 60° C., their desirable aging behavior, together with their excellent adhesive bonding and decorative characteristics, the compositions according to the invention may be used in greatly different and various forms (molded or extruded pieces, films, sheets, fibers, etc.), whether as such, or as complex or composite shaped articles, duplicate moldings, coextruded films.

The molded or extruded shaped articles may be produced by known molding and extrusion techniques, with the temperatures applied generally being similar to those of the compounding of the components according to the invention (generally ±20° C.).

Among the fields of application of the molded or extruded shaped articles, the following are particularly representative:

(a) The field of eyeglass production, including fabrication of with spectacle frames, nose-engaging items, protective masks (safety, ski, diving), (b) Footwear, including production of soles, weltings, ski boot casings, (c) Casings or shells of golf balls, golf balls, per se, (d) Production of shaped articles of widely different sizes, for example piano keys, road markers, etc.

The films or sheets shaped from the compositions according to the invention are produced by any known extrusion process, such as flat extrusion/calendering, extrusion/coating, extrusion/blow molding, with the temperature of extrusion generally ranging from 190° to 250° C.

According to *Modern Plastics Encyclopedia*, the term "film" is reserved for articles having a cross-section thickness of less than 250 μm and the term "sheet" for articles having larger thicknesses, up to several mm, but, hereinafter, for the sake of simplicity, the terms may be used to designate both films and sheets.

The films produced from the compositions of the invention may be used as such, but they may also be employed in the production of multilayer films, for example by co-extrusion, hot laminating, etc.

The single or multilayer films may also be used as such, for example in the packaging field as casings, bags, etc.

Single layer films are particularly suitable for application to fabrics, nonwoven materials, the covering of natural or synthetic fibers, foams, and the like.

Multilayer films that are especially preferred comprise:

(i) a layer of an aliphatic polyamide (such as PA-6, PA-6/6, PA-11, PA-12, PA-12/12), of an amorphous polyamide, a thermoplastic elastomer based on a polyamide and/or a copolymer of ethylene and vinyl alcohol (EVOH), and (ii) a layer of the composition according to the invention.

These films may be adhesively bonded to rigid pieces and, in particular, to metallic pieces (such as cables, sheets), on wooden pieces and synthetic pieces, preferably based on, covered or impregnated with epoxy resin or resins and/or polyurethane or polyurethanes.

The process for the preparation of these composite materials is advantageously carried out via the following two-stage technique:

A two-layer film is co-extruded first and then hot melt bonded on the side of the layer of the composition according to the invention, to the rigid support, for example by hot forming or thermoforming.

These composite materials may be decorated by the techniques of sublimable ink transfer printing and, in particular, by the processes described in FR-2,596,286. These materials may also be decorated by other techniques, such as silk screen printing, painting or varnishing, hot transfer, tampography, ink jet, laser marking. It will be appreciated that the decorating techniques are applicable to the compositions according to the invention in any form (film, molded pieces, fibers, etc.).

The composite materials comprised of the two-layer film described above and a support impregnated with an epoxy resin or resins, and/or a polyester or polyesters and/or a polyurethane or polyurethanes, and, optionally, decorated, are especially suitable for water skies, surfboards, sailboards, casters, boat hulls, decorative panels, car body bottoms, acoustic panels, thermal insulation, and the like.

The compositions of the invention in the form of single layer films may also be used as binders in the co-extrusion of multilayer films, permitting the bonding together of layers which otherwise are difficult or even impossible to join.

For example, films of the compositions according to the invention may be used as binders in the co-extrusion of a polycarbonate (PC) film and a film of a copolymer of ethylene and vinyl alcohol (EVOH).

The compositions of the invention, in the form of mono- or multilayer films, are especially suitable for the preparation of foam/fabric combinations by the technique of "foam backing". In a laminating machine, at least one assembly comprising a sample of fabric, a film according to the invention and, optionally, a foam layer, are superimposed onto each other and are then hot laminated.

After cooling, this complete assembly is placed into a mold and a thermosetting resin foam, for example a thermosetting polyurethane, is injected therein. The in situ expansion/reaction of the constituents of the foam securedly adheres the composite to the foam.

The interlayer of the film according to the invention between the sample of fabric and the foam is particularly advantageous because it prevents the foam from penetrating through the fabric.

In order to further illustrate the present invention and the advantages thereof, the following specific examples are given, it being understood that same are intended only as illustrative and in nowise limitative.

In said examples to follow, all parts and percentages are given by weight, unless otherwise indicated.

EXAMPLE I

1. In a single screw extruder, the velocity of which was controlled at 150 rpm, 60 parts of polyetheresteramide (A1) and 40 parts of the copolymer of ethylene and maleic/vinyl acetate (B1) were compounded.

The extrusion temperature ranged from 200° to 250° C. and the throughput of the extruder was controlled at 20 kg/h.

Upon exiting the die, the composition obtained in the form of particulates with an average grain size of 3 mm, had a melt index (MI) of 1.31, measured at 190° C. under a load of 2.16 kg, according to ASTM Standard D 1238.

The polyetheresteramide (A1) was composed of 88% of PA-12 recurring structural units or sequences ($\overline{Mn}$=5,000) and 12% of PTMG (B1) sequences ($\overline{Mn}$=650).

The maleic/EVA was composed of 18% vinyl acetate and 0.27% maleic anhydride; its melting point was 86° C. and its Vicat softening point, measured according to the standard D 1525, was 61° C.

Table 1 below reports the following for the polyblend composition I.1 and the respective constituents A1 and B1:

(a) Shore D hardness (5s), measured according to ISO Standard 868;

(b) the bending modulus of elasticity at 20° C. and the rigidification coefficient between 20° and –20° C., measured according to ASTM D 790;

(c) tear strength measured by ISO Standard 34 (method B) (tearing perpendicular to the direction of injection);

(d) notched Izod impact strength according to ISO 180;

(e) tensile strength measured at –40° C. according to ASTM D 638.

A two-layer PA-11/composition I.1 sheet was then co-extruded.

The conditions of the co-extrusion were as follows:
Extrusion temperature:
  of the PA-11: 210°/230°/240°/240° C.
  of composition I.1: 205°/230°/230°/230° C.
Die temperature: 245° C.
Calender temperature: 50°/35°/50° C.

A two-layer sheet was thus produced comprising:
(i) a layer of PA-11 ($\overline{Mn}$=20,000) having an approximate thickness of 0.3 mm,
(ii) a layer of composition I.1 having an approximate thickness of 0.5 mm.

This two-layer film was then hot melt bonded to an epoxy substrate comprising a textile lap (glass fiber) impregnated with 30% of an epoxy resin based on bisphenol-A, in the presence of an amine hardener of the M.D.I. type and a crosslinking accelerator.

The two-layer sheet was bonded to the support substrate in a mold at approximately 150° C. under a pressure of 8 kg/cm$^2$, then cooled and stripped therefrom.

The extent of adherence of the two-layer sheet to the epoxy support was measured after 72 h in distilled water, according to NFT Standard 76-112.

The adherence results are reported in Table 2 and are the average values of 5 tests.

2. A composition (I.2) was compounded under the same conditions as for I.1; it was composed of 90 parts I.1 and 10 parts of glass fibers having an average length of 4 mm.

This composition was then co-extruded with PA-11 having the same properties as that in I.1. The two-layer coextrudate thus produced comprised:
(i) a layer of PA-11 having an approximate thickness of 0.3 mm,
(ii) a layer of composition I.2 having an approximate thickness of 0.5 mm.

This coextrudate was then bonded to an epoxy support under the same conditions as for I.1.

The adherence results are also reported in Table 2.

3. A composition (I.3) composed of 90 parts I.1 and 10 parts of glass fibers having an average length of 4 mm was compounded under the same conditions as for I.1. The two-layer coextrudate thus produced comprised:
(i) a layer of PA-11 having an approximate thickness of 0.3 mm,
(ii) a layer of composition I.3 having an approximate thickness of 0.5 mm.

This coextrudate was then bonded to an epoxy support under the same conditions as for I.1.

The adherence results are also reported in Table 2.

4. Under the same conditions as for I.1, a composition (I.4) was compounded; it was composed of 80 parts of I.1 and 20 parts of CaCO$_3$ having an average particle size of 40 µm.

This composition was then co-extruded with PA-11 having the same properties as in I.1. The two-layer coextrudate thus produced comprised:
(i) a layer of PA-11 having an approximate thickness of 0.3 mm,
(ii) a layer of composition I.4 having an approximate thickness of 0.5 mm.

It was then bonded to an epoxy support substrate under the same conditions as for I.1.

EXAMPLE II

Under the above conditions for I.1, 60 parts of polyetheresteramide (A1) and 40 parts of the copolymer of ethylene and maleic/vinyl acetate (B2) containing 28% vinyl acetate and 0.2% maleic anhydride (melting point 75° C., Vicat point 57° C.) were compounded. The polyblend composition obtained (II) (MI=1.89) was then co-extruded with PA-11 and then bonded to an epoxy support under the same conditions as for I.1.

The properties of B2 and II are reported in Table 1.

The adherence results are reported in Table 2.

EXAMPLE III

Under the above conditions for I.1, 60 parts of polyetheresteramide (A1) and 40 parts of the copolymer of ethylene and vinyl acetate (B3) containing 28% vinyl acetate (MI=3) were compounded.

The polyblend composition (III) obtained (MI=3.5) was then co-extruded with PA-11 and bonded to an epoxy support under the same conditions as for I.1.

The characteristics of B3 and III are reported in Table I.

The adherence results are reported in Table 2.

EXAMPLE IV (COMPARATIVE)

For purposes of comparison and according to EP-312,968, under the above conditions as for I.1, 50 parts of polyetheresteramide (A2), 1 part of silane, 19 parts of talc and 30 parts of tackifying resins were compounded.

The polyetheresteramide A2 was composed of 50% of PA-12 ($\overline{Mn}$=2,000) and 50% of sequences of PTMG ($\overline{Mn}$=2,000).

The polyblend composition obtained (IV) (MI=4) was then co-extruded with PA-11 and subsequently bonded to an epoxy support under the same conditions as for I.1.

The adherence results are reported in Table 2.

EXAMPLE V

Under the above conditions as for I.1, 80 parts of polyetheresteramide (A1) and 20 parts of maleized SBS (B6) were compounded.

The maleized SBS was a styrene/1.3-butadiene/styrene block copolymer containing 30% styrene and 0.2% maleic anhydride, MI=4.

The polyblend composition (V) obtained was then co-extruded with PA-11 and subsequently bonded to an epoxy support under the same conditions as for I.1.

EXAMPLE VI

Under the above conditions for I.1, 60 parts of polyetheresteramide (A1) and 40 parts of the copolymer of ethylene, vinyl acetate and glycidyl methacrylate (B6) (MI=10; melting point=97° C.) were compounded.

The extrusion temperature ranged from 175° to 225° C., the velocity of the screw was 150 rpm and the throughput of the extruder was controlled at 30 kg/h.

EXAMPLE VII

Under the above conditions for I.2, 60 parts of polyetheresteramide (A2) and 40 parts of EVA (B3) were compounded. The polyblend composition obtained (VII) was then molded in the form of nose-fitting shaped articles.

The characteristics of B3 and VII are reported in Table 1.

EXAMPLE VIII

1. Under the above conditions for I.1, 90 parts polyetheresteramide (A3) and 10 parts maleized EVA (B7) were compounded.

The polyetheresteramide A3 was composed of 30% of PA-12 ($\overline{Mn}$=850) recurring structural units and 70% PTMG ($\overline{Mn}$=2,000) sequences.

The maleized EVA B7 was composed of 14% vinyl acetate and 0.35% maleic anhydride. Its melting point was 94° C. and its Vicat point 71° C.

Composition VIII was then extruded into sheets having a thickness of 100 µm and then bonded to a textile material.

2. Under the above conditions for I.1, a film having a thickness of 100 µm was shaped; it was then bonded to a textile material comprising 80 parts of A3 and 20 parts of B7.

3. Under the above conditions for I.1, a 100 µm thick film, composed of 70 parts A3 and 30 parts B7, was prepared and bonded to a textile material.

EXAMPLE IX

1. Under the above conditions for I.1, 30 parts of A3, 42 parts of B3, 28 parts $CaCO_3$ and 3 parts of a white masterbatch were compounded.

Composition IX (d=1.18) was then injection molded into practice golf balls (solid balls) weighing 45.17 g.

The injection temperature ranged from 190° to 200° C., the total molding time was 46 s, of which 23 s were allowed for cooling.

The height of rebound of the ball (restitution) was loosely measured without an initial velocity (height of drop of 150 cm) onto a vitrified flooring by means of a camera (focal length 5.6) placed 0.4 m in front of the measuring screen.

The rebound height is 91.85 cm.

EXAMPLE X

Under the above conditions for I.1, 40 parts of A3, 36 parts of B3, 24 parts $CaCO_3$ and 3 parts of the white masterbatch were compounded.

Composition X (d=1.16) was injection molded under the conditions of Example IX in the form of solid golf balls weighing 44.53 g.

The rebound height, measured as in Example IX, was 93.6 cm.

EXAMPLE XI

Composition (III) was co-extruded with EVOH (containing 44% ethylene; d=1.14; MI=3.5; melting point 164° C.).

The co-extrusion conditions were the following:
Extrusion temperature:
  EVOH: 220°/220°/235° C.
  III: 200°/210°/220°/230° C.
Die temperature: 220° C.
Calender temperature: 50°/35°/50° C.

At the outlet of the die, a two-layer sheet was produced. It comprised:
  (i) a layer of EVOH having a thickness of about 0.3 mm,
  (ii) a layer of Composition III having a thickness of about 0.8 mm.

EXAMPLE XII

Under the above conditions for I.1, 70 parts of polyetheresteramide (A4) and 30 parts of B7 were compounded.

The polyetheresteramide A4 was composed of 80% PA-12 ($\overline{Mn}$=4,000) recurring structural units and 20% PTMG ($\overline{Mn}$=1,000) sequences.

The polyblend composition (XII) obtained was then co-extruded as a binder layer between EVOH and crystalline polycarbonate.

The EVOH had the same characteristics as in Example XI.

The crystalline polycarbonate is marketed by General Electric Co. under the trademark LEXAN 154.

The co-extrusion conditions were as follows:
Extrusion temperature:
  EVOH: 190°/200°/205°/210° C.
  XII: 185°/190°/190°/190° C.
Temperature of PC: 270°/275°/270°/270° C.
Die temperature: 250° C.
Calender temperature: 45°/50°/50° C.

At the die outlet, a three-layer sheet was obtained, comprising:
  (i) an EVOH layer having a thickness of about 0.3 mm,
  (ii) a XII layer having a thickness of about 0.1 mm,
  (iii) crystalline PC layer having a thickness of about 0.3 mm.

The stripping at 180° C. of the three-layer sheet was measured on a 15 mm wide specimen, by subjecting each of the external layers to traction (traction velocity=100 mm/min).

The stripping value, expressed in g/10 mm, was 910.

TABLE 1

| PROPERTIES | I.1 A1 + B1 | II A1 + B2 | III A1 + B3 | VII A2 + B3 | A1 | A2 | B1 | B3 |
|---|---|---|---|---|---|---|---|---|
| Shore Hardness D | 50 | 55 | 55 | 38 | 70 | 40 | 31 | 26 |
| Elastic Modulus | 215 | 226 | 221 | 49 | 460 | 75 | 40 | 22 |
| Rigidizing Coefficient | 3.2 | 3.1 | 3.1 | | | | 4.07 | 2.36 |
| Tearing Strength (kN/m) | 160 | | 131 | 63 | | 70 | 49.3 | 37.7 |
| Izod Impact Strength (kJ/m$^2$) | 4.8 | | 4.7 | | 5 | | 2.7 | 2.5 |
| Rupture Strength (Mpa) | 31 | | 35.3 | 14.9 | 50 | 36 | 19.4 | 19.7 |

TABLE 2

| EXAMPLE NO. | ADHERENCE (N/mm) |
|---|---|
| I.1 | 10 |
| I.2 | 11.6 |
| I.3 | 12.9 |
| II | 15.2 |
| III | 15.9 |
| IV | 9 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A multilayer film comprising (a) a layer including a polyamide, a thermoplastic elastomer based upon a polyamide, a copolymer of ethylene and vinyl alcohol, or a mixture thereof; and (b) a layer including a mixture of a polyamide-based thermoplastic elastomer (b1) and a modified polyolefin (b2) containing olefins in a proportion of at least 50% by weight of the total weight of b2, said mixture having a weight ratio b1/(b1+b2) greater than 0.5.

2. The multilayer film defined in claim 1, wherein (b2) is (1) a copolymer containing units derived from an α-olefin or diolefin monomer and a comonomer selected from the group consisting of vinyl esters of saturated carboxylic acids, unsaturated mono- and dicarboxylic acids, the esters and salts thereof and anhydrides of saturated or unsaturated dicarboxylic acids; or (2) a SBS, SIS or SEBS maleized block polymer.

3. The multilayer film defined in claim 1, wherein said polyamide-based thermoplastic elastomer in (b) is a polyester amide or a polyether amide.

4. The multilayer film defined in claim 1, wherein the polyamide of layer (a) is an aliphatic polyamide.

5. The multilayer film defined in claim 1, wherein the polyamide in layer (a) is an amorphous polyamide.

* * * * *